(12) United States Patent
Kubo (10) Patent No.: US 6,591,336 B2
(45) Date of Patent: Jul. 8, 2003

(54) TECHNIQUE FOR MAINTAINING COHERENCY BETWEEN SHARED-DISK AND DISK CACHES

(75) Inventor: Atsushi Kubo, Tokyo (JP)

(73) Assignee: NEC Corporation, Tokyo (JP)

( * ) Notice: Subject to any disclaimer, the term of this patent is extended or adjusted under 35 U.S.C. 154(b) by 43 days.

(21) Appl. No.: 09/899,089

(22) Filed: Jul. 6, 2001

(65) Prior Publication Data

US 2002/0004887 A1 Jan. 10, 2002

(30) Foreign Application Priority Data

Jul. 6, 2000 (JP) ....................................... 2000-204938

(51) Int. Cl.[7] ............................................. G06F 12/00
(52) U.S. Cl. ........................ 711/113; 711/130; 711/141; 711/147
(58) Field of Search .............................. 711/113, 130, 711/141, 147

(56) References Cited

U.S. PATENT DOCUMENTS 4,423,479 A * 12/1983 Hanson et al. ............... 711/113
4,593,354 A * 6/1986 Ushiro ........................ 714/48
5,987,568 A * 11/1999 Adams et al. ............... 711/118
6,173,377 B1 * 1/2001 Yanai et al. ................. 711/162
6,304,946 B1 * 10/2001 Mason, Jr. .................. 711/143

FOREIGN PATENT DOCUMENTS

| JP | 61-173355 | 8/1986 |
|----|-----------|--------|
| JP | 64-76345  | 3/1989 |

* cited by examiner

*Primary Examiner*—Reba I. Elmore
(74) *Attorney, Agent, or Firm*—Sughrue Mion, PLLC (57) ABSTRACT

Each of a plurality of host devices sharing one disk device with each other includes a disk cache. When one of the host devices writes data in a cache included therein, it sends information that the data has been written in the cache, to the shared disk device and the other host devices. The shared disk device retains the sent information, while each of the other host devices erases the data of a corresponding block from its cache. When the other host device reads the data of the block, there is a cache miss, so that the other host device requests the shared disk device to transmit the data of the block. The shared-disk device transmits the block into the cache of the host device having requested the transmission of the block, based on information retained in an internal register of the shared-disk device.

20 Claims, 8 Drawing Sheets

TECHNIQUE FOR MAINTAINING COHERENCY BETWEEN SHARED-DISK AND DISK CACHES

BACKGROUND OF THE INVENTION

1. Field of the Invention

The present invention relates to a technique, in a system wherein a plurality of host devices share an external storage device, for maintaining coherency between the external storage device and a cache included in each of the host devices.

2. Description of the Related Art

To balance the access time of a memory and magnetic disk unit, a disk cache is prepared for retaining, in the memory, a portion of data stored on a disk. For example, in response to an instruction for reading data on the disk, if the corresponding data exists in the disk cache, a processor of a system having the disk cache reads out the data from the disk cache, without reading the data from the disk, thereby improving the average access time.

A disk is shared by a plurality of host devices, and a disk cache may be included in each of the host devices. Unexamined Japanese Patent Application KOKAI Publications Nos. S61-173355 and S64-76345 disclose a technique for including a disk cache in each of a plurality of host devices that share a disk. In the technique of the former publication, data stored in the disk cache included in each of the host devices is to be read only, not updated, and hence no problem should occur in the coherency between each of the disk caches and the shared disk.

In the technique of the latter publication, data is written into the disk cache of each of the host devices, and the following control processing is performed for maintaining the coherency between each of the disk caches and the shared disk. In the case where one host device is to write data in its disk cache, the host device informs another host device about the writing of data, and reserves the shared disk. At the time the one host device writes data into the disk cache therein, the one host device writes the data into the shared disk, and erases the data of the same block retained in the disk cache of the other host devices.

In this conventional technique, in the case where data is written sequentially in successive areas of a disk cache in one host device, the above-described control processing for maintaining the coherency is required, each time the data is written to one address. In this conventional technique, the overhead of the process for maintaining the coherency is large, and hence there is a problem that the average access time for accessing a file is quite long.

SUMMARY OF THE INVENTION

The present invention has been made in consideration of the above. It is accordingly an object of the present invention to provide a technique for reducing an average access time for each of a plurality of host devices to access data, while maintaining coherency between a cache included in each of the host devices and an external storage device which is shared by the plurality of host devices.

In order to achieve the above object, according to the first aspect of the present invention, there is provided an external-storage sharing system including a plurality of host devices and an external storage device which is connected to each of the host devices, and each of the host devices has a cache retaining a portion of data stored in the external storage device.

Furthermore, in a case where data is written in its own cache, each of the host devices informs any of the other host devices and the external storage device that the data is to be written and informs them about information representing a block including the data to be written. In a case where reading or writing data of the block of any one of the plurality of host devices, each of the host devices requess the external storage device to transmit the data of the block, and after the data of the block is written back into the external storage device in response to this request, reads or writes the data. In a case where transmission of data is requested from any one of the host devices, the external storage device writes back the data of the block from the cache of one of the host devices having informed that the data has been written and transmits the data of the block to the cache of one of the host devices having requested the transmission of the data, after the data of the block is written back into the external storage device.

In the above external-storage sharing system, even if data is written in the cache of one of the host devices, the data is written in the disk device only when the data of a corresponding block is required by another one of the host devices. In the case where data is written to successive addresses in one host device, there is no need to write the latest data in the external storage device.

In the case where the data of the block is required by the another one of the host devices, the data is read or written after the data stored in the external storage device is updated. Hence, there should be no coherency problem between the external storage device and the cache of each of the host devices. That is, in the external-storage sharing system of this invention, while maintaining the coherency therebetween, a reduction in the average access time can be realized.

In the external-storage sharing system according to the first aspect of the present invention, each of the host devices may also erase the data of the block included in its own cache, in a case where any of the other host devices informs each of the host devices to write the data of the block.

In order to achieve the above object, according to the second aspect of the present invention, there is provided an external-storage sharing system including a plurality of host devices and an external storage device, which is connected to each of the host devices and stores data in a unit of blocks. Each of the plurality of host devices includes a cache retaining data of a part of entire blocks included in the external storage device, a first memory storing a first program for reading and writing data stored in the external storage device and a second program for maintaining coherency between the external storage device and the cache of each of the host devices, and a processor for executing the first and second programs stored in the first memory.

The second program, in a case where data to be written in accordance with the first program is retained in the cache included in a corresponding one of the host devices, writes the data to be written in the cache in the corresponding one of the host devices, and informing any other host device and the external storage device that writing of the data is performed. In addition, the second program also requests the external storage device to transmit the data of the block, in a case where data of a block including data that is informed from any other host device in accordance with the first program is to be read. Finally, the second program reads data from the cache included in the corresponding one of the host devices, after storing the data of the block which is transmitted from the external storage device in response to the request for transmission of the data.

The external storage device includes a second memory storing a third program for maintaining coherency between the external storage device and the cache of each of the host devices, and a processor executing the third program stored in the second memory. The third program manages information representing whether data of each block which is stored in the external storage device is the latest data, in accordance with the information for writing data and which is sent from each of the host devices; and transmits the latest data as requested data of a corresponding block to a corresponding host device which has sent the request, in response to a request for transmission of data from any one of the host devices.

In the external-storage sharing system according to the second aspect of the present invention, the second program may also erase a block including the data from the cache included in a corresponding host device, in a case where any other one of the plurality of host devices informs that writing of data is performed, and the request for transmission of data, in case of data reading, may request the external device to transmit the data of the block, in a case where data to be read is erased from the cache included in the corresponding host device.

In the external-storage sharing system according to the second aspect, the second program may also request the external storage device to transmit the data of the block in a case where data of a block is to be written including data which is informed from any other host device in accordance with the first program, and write data to be written into the cache included in a corresponding host device, after storing the data of the block which is transmitted from the external storage device in response to the requesting of the transmission of the data, in the cache in the corresponding one of the host devices.

In the external-storage sharing system according to the second aspect, the second program may also erase a block including the data from the cache included in the corresponding host device, in a case where any other host device informs that writing of data is performed. In this case, the request for transmission of data may request the external storage device to transmit the data of the block, in a case where data to be written has been erased from the cache of the corresponding one of the plurality of host devices.

In the external-storage sharing system according to the second aspect, the third program may also determine whether data of a corresponding block which is retained in the external storage device is latest data, in a case where transmission of data is requested from one of the plurality of host devices, request one of the host devices which has a cache retaining the latest data to transmit the data of the block, in a case where it is determined that the data is not the latest data, and store in the external storage device the data of the block that is transmitted from the host device having requested the transmission of the data in response to the requesting of transmission of the data.

In this case, transmitting data to the host device having requested the transmission of the data may be executed upon transmission of the data of the block from the host device having requested the transmission, and the second program may also transmit the data of a corresponding block which is retained in the cache included in the corresponding one of the plurality of host devices, in a case where transmission of data is requested from the external storage device in accordance with the third program.

In the external-storage sharing system according to the second aspect, the external storage device and the plurality of host devices may be connected to each other through a network, and may transmit and receive data to and from each other through a network.

In the external-storage sharing system according to the second aspect, the external storage device may be a hard disk device, for example.

In the external-storage sharing system according to the second aspect, the cache may be prepared in a portion of the first memory included in each of the host devices.

In order to achieve the above object according to the third aspect of the present invention, there is provided a host device which shares an external storage device storing data in a unit of blocks with at least one host device. This host device includes a cache which retains data of a part of entire blocks included in the external storage device; a memory which stores a first program for reading and writing data stored in the external storage device and a second program for maintaining coherency between the external storage device and the host device; and a processor which executes the first and second programs stored in the memory. The second program writes data to be written in the cache included in the processor, in a case where data to be written in accordance with the first program is retained in the cache included in the memory of the host device; and informs at least one host device and the external storage device that the writing of the data is performed. It also requests the external storage device to transmit the data of the block, in a case where data of a block including data is to be read, which is informed from the one host device in accordance with the first program, and reads data to be read out from the cache included in the memory of the host device after storing the data of the block which is transmitted from the external storage device in response to the request for transmission of the data.

In the host device, the second program may further include a step of erasing a block including the written data from the cache included in the memory of the host device in a case where the at least one host device informs that writing of data is performed. In this case, the request for the transmission of data may request the external storage device to transmit data of a corresponding block, in a case where the data to be read is erased from the cache included in the memory of the host device.

In the host device, the second program may also request the external storage device to transmit the data of the block in a case where data of a block including data that is informed from the one host device in accordance with the first program is to be written; and write data to be written in the cache included in the memory of the host device after storing in the cache the data of the block transmitted from the external storage device in response to the request for the transmission of the data.

In the host device, the second program may also erase a block including the data from the cache included in the memory of the host device, in a case where the one host device informs that writing of data is performed. In this case, the request for the transmission of data requests the external storage device to transmit the data of the block in a case where data to be written has been erased from the cache included in the memory of the host device.

In order to achieve the above object, according to the fourth aspect of the present invention, there is provided a method for use in a system for sharing an external storage device between a plurality of host devices each having a cache for maintaining coherency between the external storage device and the cache included in each of the host devices. The method includes informing the external storage device and any other one of the host devices that the data is to be written in the cache and about information regarding a block including the data to be written, in a case where to write data in the cache of an arbitrary one of the plurality of host devices; requesting, in one of the plurality of host devices the external storage device to transmit the data of the block in a case where to read or write data of the block which is written and has already been informed from the arbitrary one of the plurality of host devices; writing back in the external storage device the data of the block from the cache of the arbitrary one of the host devices having informed about the writing of data in a case where transmission of data is requested, reading or writing the data in the any other one of the plurality of host devices, after the data of the block is written back into the external storage device; and transmitting the data of the block from the external storage device into the cache of the other one of the host devices having requested the transmission of the data, after the data of the block has been written back thereinto.

The above-described method may further include erasing the data of the block inside the cache included in the arbitrary one of the plurality of host devices, in a case where the information is sent by any other of the host devices.

In order to achieve the above object, according to the fifth aspect of the present invention, there is provided a computer readable recording medium which records a program executed in each of a plurality of host devices so as to maintain coherency between a cache included in each of host devices and an external storage device. The program writes data to be written into the cache included in a corresponding one of the host devices and informs any other of the host devices that the writing of the data is performed, in a case where the data to be written is retained in the cache included in the corresponding one of the plurality of host devices, The program also requests the external storage device to transmit the data of the block in a case where data of a block including data which is written and informed by the other one of the host devices to be transmitted, and reads data to be read from the cache included in the corresponding one of the plurality of host devices, after storing the data of the block transmitted from the external storage device in response to the request for transmission of the data.

In the recording medium, the program may also include erase the block of the data from the cache of the corresponding one of the plurality of host devices in a case where the other one of the host devices informs that the writing of data is performed. In this case, the request for transmission of data may request the external storage device to transmit data of a block, in a case where the data to be read has been erased from the cache included in the corresponding one of the plurality of host devices.

In the recording medium, the program may also request the external storage device to transmit the data of the block in a case where data of a block including data which is written and informed by the other one of the host devices is to be transmitted, and write data to be written in the cache of the corresponding one of the plurality of host devices, after storing, into the cache of the corresponding one of the plurality of host devices, the data of the block transmitted from the external storage device in response to the requesting of transmission of the data.

In the recording medium, the program may also erase the data of the block from the cache of the corresponding host device, in a case where the other one of the host devices informs that writing of data is performed. In this case, the request for the transmission of data requests the external storage device to transmit data of a block, in a case where the data to be written has been erased from the cache of the corresponding one of the plurality of host devices.

BRIEF DESCRIPTION OF THE DRAWINGS

The object and advantages of the present invention will become more apparent upon reading of the following detailed description and the accompanying drawings in which.

DETAILED DESCRIPTION OF THE PREFERRED EMBODIMENT

A preferred embodiment of the present invention will now be explained with reference to the accompanying drawings.

Figure 1:
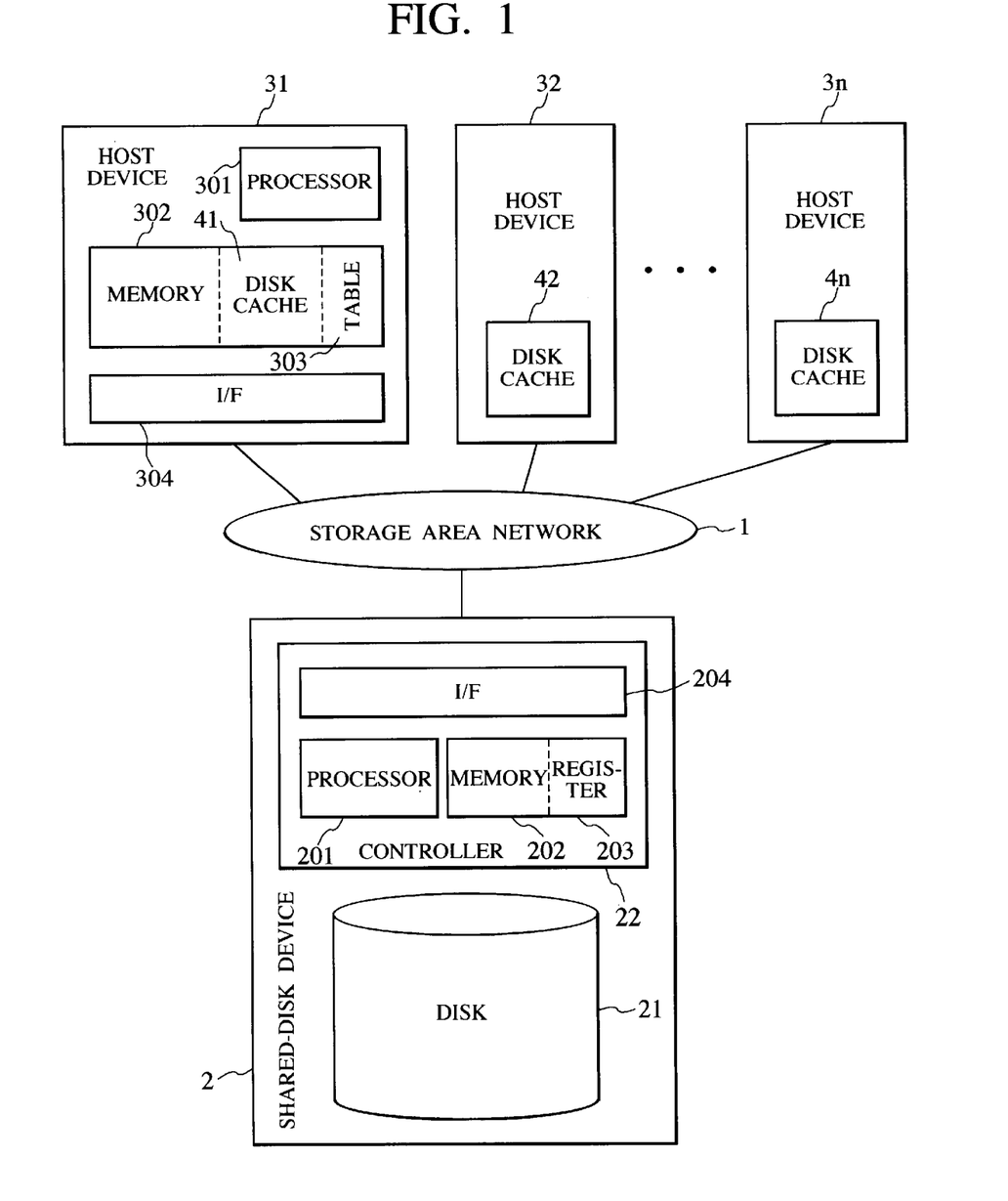
FIG. 1 is a block diagram showing the structure of a disk sharing system according to an embodiment of the present invention.

FIG. 1 is a block diagram showing the structure of a disk sharing system according to the embodiment of the present invention. As shown in FIG. 1, this disk sharing system comprises a shared-disk device 2 and a plurality of host devices 31 to 3n, which are connected with each other through a storage area network 1. The host devices 31 to 3n have disk caches 41 to 4n, respectively.

The shared-disk device 2 is a hard disk device including a disk 21 and a controller 22. The disk 21 is composed of a magnetic disk and a head, and stores data in the unit of blocks, which are divided according to their address and each of which has a predetermined block size. The controller 22 has a processor 201, a memory 202, and an interface 204. The memory 202 includes an area, in which a register 203 for storing control data is prepared.

The processor 201 executes a program stored in the memory 202, and reads and writes data from and onto the disk 21. The processor 201 also executes a process for maintaining coherency between the disk 21 and the disk caches 41 to 4n, and sends a message to each of the host devices 31 to 3n through the storage area network 1, as needed. The interface 204 controls the data transmission rate, etc.

Each of the host devices 31 to 3n has a processor 301, a memory 302, and an interface 304 (specifically shown in the case of the host device 31 by way of example in FIG. 1). A part of area of the memory 302 is used as one of the disk caches 41 to 4n. Each of the disk caches 41 to 4n is to hold a part of the data stored on the disk 21, in the unit of blocks each having the same block size as the size of the block of the disk 21. In a part of the area of the memory 302, an address conversion table 303 is prepared (specifically shown in the case of the host device 31 by way of example in FIG. 1).

The processor 301 executes a program stored in the memory 302, reads and writes data from and into the disk caches 41 to 4n. The processor 301 also sends a message necessary for maintaining coherency between the disk caches 41 to 4n and the disk 21, to any other one of the host devices 31 to 3n and the shared-disk device 2 through a storage area network 1. The processor 301 executes a process necessary for maintaining the coherency, in accordance with a message received from another one of the host devices 31 to 3n or the disk device 2. The interface 304 controls the data transmission rate, etc.

Operations of the disk sharing system according to this embodiment will now be explained.

The processor 301 executes the program stored in the memory 302 so as to carry out a predetermined process. In this process, if the processor 301 issues a request for reading or writing data, it executes the process for maintaining the coherency. The processor 301 also carries out a process for maintaining the coherency, when it receives a message from the shared-disk device 2 or another one of the host devices 31 to 3n. The processor 201 included in the shared-disk device 2 carries out a process for maintaining the coherency, when it receives a message from any one of the host devices 31 to 3n. Explanations will now be made to the above processes with reference to flowcharts.

Figure 2:
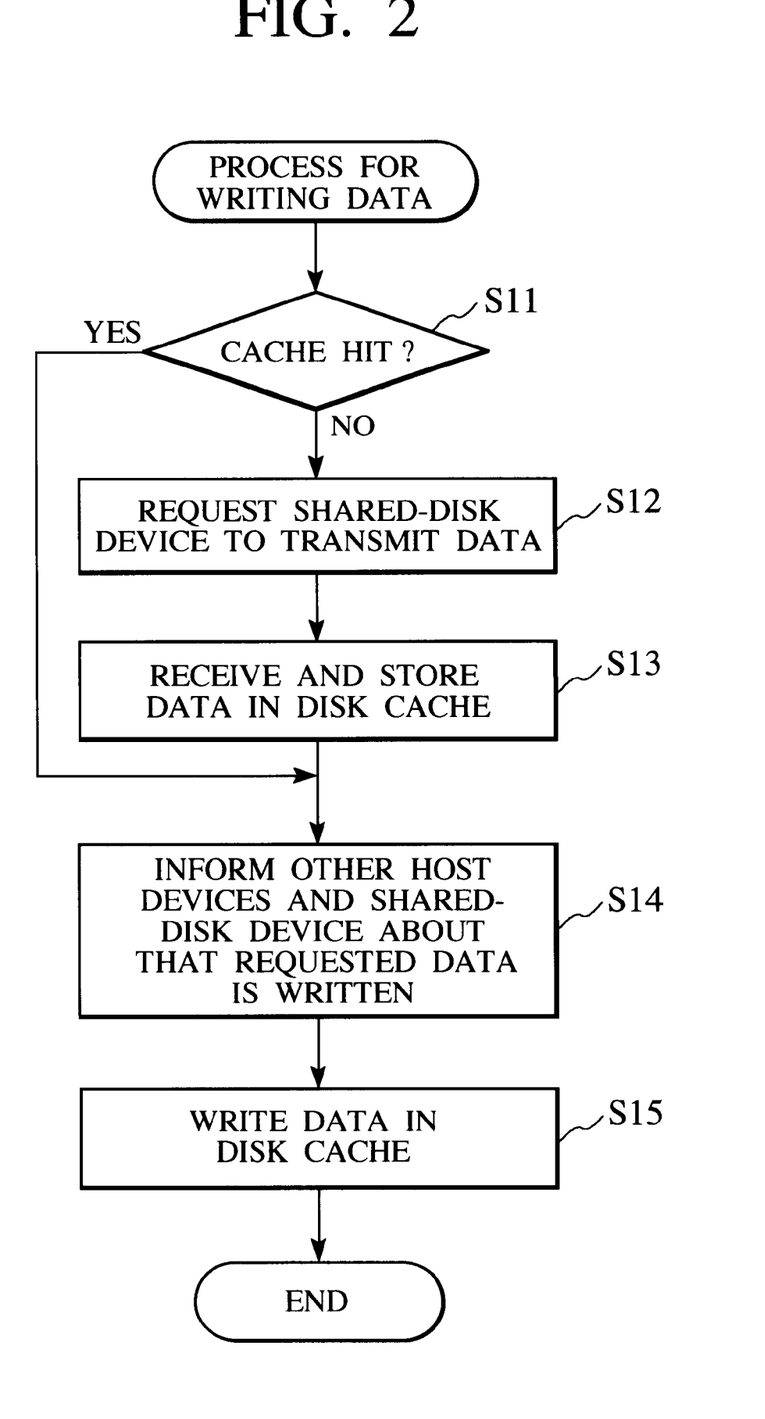
FIG. 2 is a flowchart showing a process which is carried out in a case where a request for writing data is issued in each host device.

FIG. 2 is a flowchart showing a process, which is carried out by the processor 301 included in each of the host devices 31 to 3n in response to a request for writing predetermined data.

The processor 301 refers to the address conversion table 303 in accordance with an address of the predetermined data requested to be written, and determines whether a block including the predetermined data is stored in a corresponding one of the disk caches 41 to 4n (Step S11). In other words, the processor 301 determines whether there is a cache hit in the corresponding one of the disk caches 41 to 4n. In the case where there is the cache hit in the corresponding one of the disk caches 41 to 4n, the flow advances to the procedure of a later-described step S14.

On the contrary, in the case where the cache hit does not occur in the corresponding one of the disk caches 41 to 4n, the processor 301 sends a message for requesting transmission of one block of data, together with information representing the block including the data requested to be written, to the shared-disk device 2 through the storage area network 1 (Step S12). Upon transmission of this message, the processor 301 will be in a processing wait state. If the processor 301 receives the requested block data from the shared-disk device 2, it stores the received data in the corresponding one of the disk caches 41 to 4n (Step S13). Then, the flow advances to the procedure of the step S14.

In the step S 14, the processor 301 sends an information message for representing that the requested data is written in its corresponding one of the disk caches 41 to 4n, together with the address (the address in the disk 21) of the written data, to any other one of the host devices 31 to 3n and shared disk device 2, through the storage area network 1. After this, the processor 301 writes the data requested to be written to the address shown by the address conversion table 303 of the corresponding one of the disk cache 41 to 4n (Step S15), completing the procedures of this flowchart.

Figure 3:
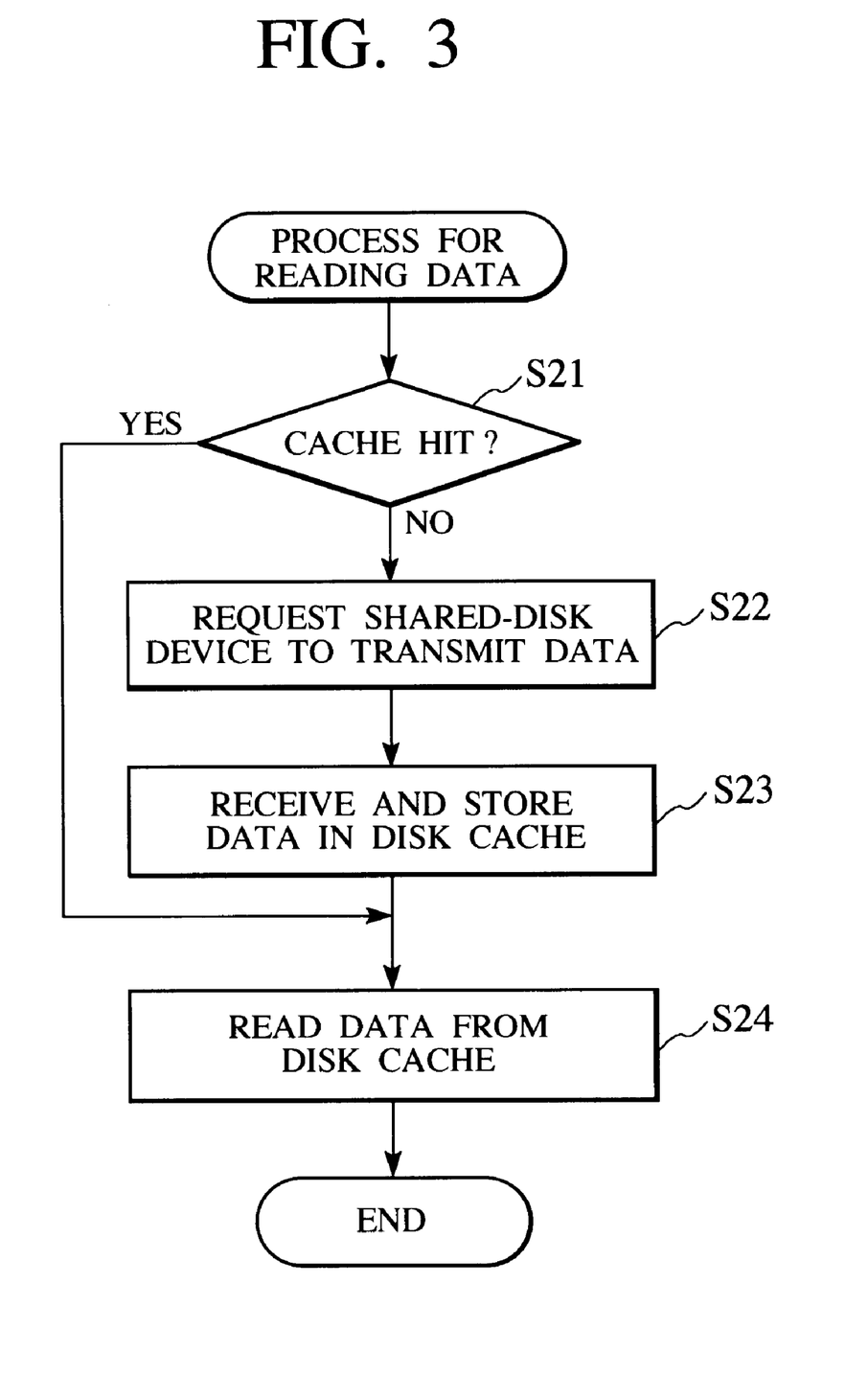
FIG. 3 is a flowchart showing a process which is carried out in a case where a request for reading data is issued in each host device.

FIG. 3 is a flowchart showing a process which is carried out by the processor 301 of each of the host devices 31 to 3n, in response to a request for reading data.

The processor 301 refers to the address conversion table 303 in accordance with an address of predetermined data which is requested to be read out, and determines whether a block including the predetermined data is stored in the corresponding one of the disk caches 41 to 4n (Step S21). In other words, the processor determines if there is a cache hit in a corresponding one of the disk caches 41 to 4n. In the case where there is the cache hit in the corresponding one of the disk caches 41 to 4n, the flow advances to the procedure of a later-described step S24.

On the contrary, if there is no cache hit in the corresponding one of the disk caches 41 to 4n, the processor 301 sends a message for requesting transmission of one block of data, together with information indicating the block including the predetermined data requested to be read out, to the shared-disk device 2 through the storage area network 1 (Step S22). Upon transmission of this message, the processor 301 will be in a processing wait state. If the processor 301 receives the one block of data from the shared-disk device 2, it stores the received data in the corresponding one of the disk caches 41 to 4n included in the same host device (Step S23). Then, the flow advances to the procedure of the step S24.

In the step S24, the processor 301 reads out the predetermined data requested to be read out, by referring to the address shown by the address conversion table 303 of the corresponding one of the disk caches 41 to 4n, and thus completing the procedures of this flowchart.

Figure 4:
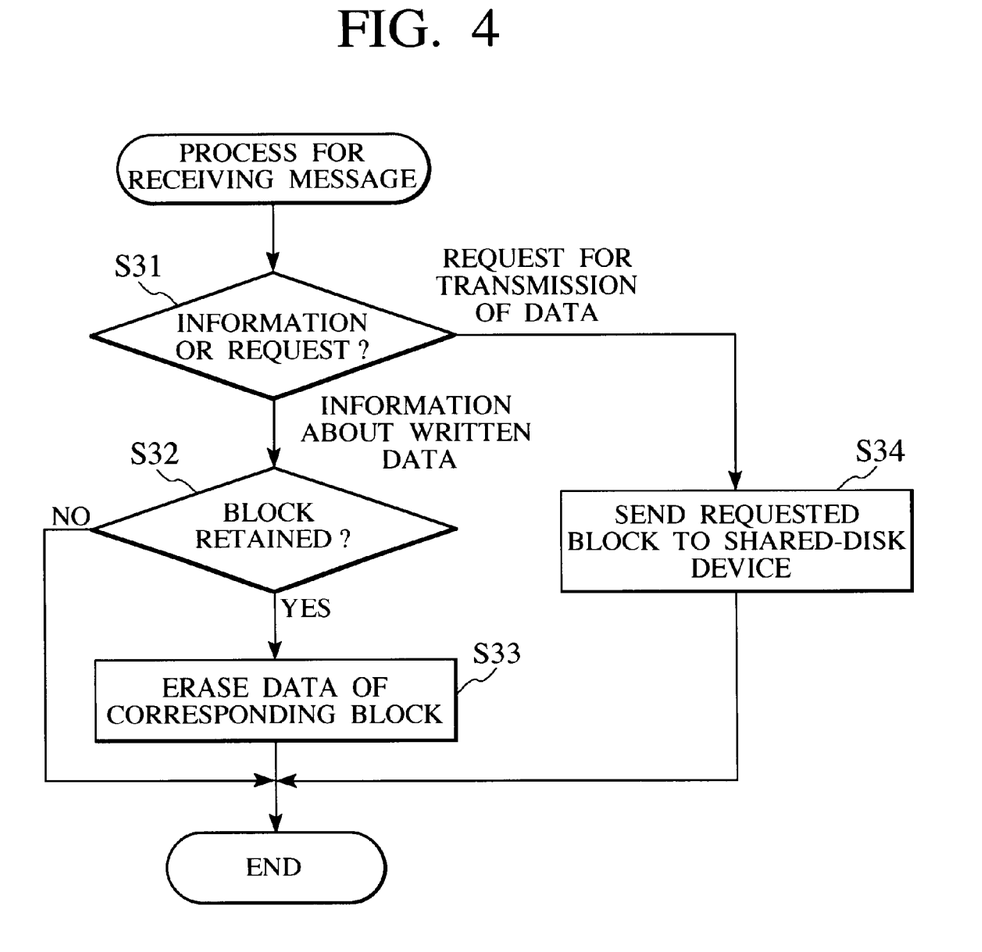
FIG. 4 is a flowchart showing a process which is carried out in a case where a host device receives a message from another host device or a shared-disk device.

FIG. 4 is a flowchart showing a process which is carried out by the processor 301 of each of the host devices 31 to 3n, in the case where the processor 301 receives a message from another one of the host devices 31 to 3n or shared-disk device 2.

The processor 301 determines whether the received message is the information message sent from another one of the host devices 31 to 3n in the step S15 or a request message sent from the shared disk device 2 in a later-described step S44 (Step S31). In the case where it is determined that the received message is the information message, the processor 301 determines whether a block indicated by the information message is stored in the corresponding one of the disk caches 41 to 4n (Step S32).

In the case where it is determined that the block is stored in the corresponding one of the disk caches 41 to 4n, the processor 301 erases the data of the block by updating the address conversion table 303 (Step S33), and thus completing the procedures of this flowchart. On the contrary, in the case where it is determined that the block is not stored in the corresponding one of the disk caches 41 to 4n, the process of this flowchart is terminated at this moment.

In the case where the received message is the request message, the processor 301 sends data of the block which is stored in the corresponding one of the disk caches 41 to 4n to the shared-disk device 2 through the storage area network 1 (Step S34), and then completing the procedures of this flowchart.

Figure 5:
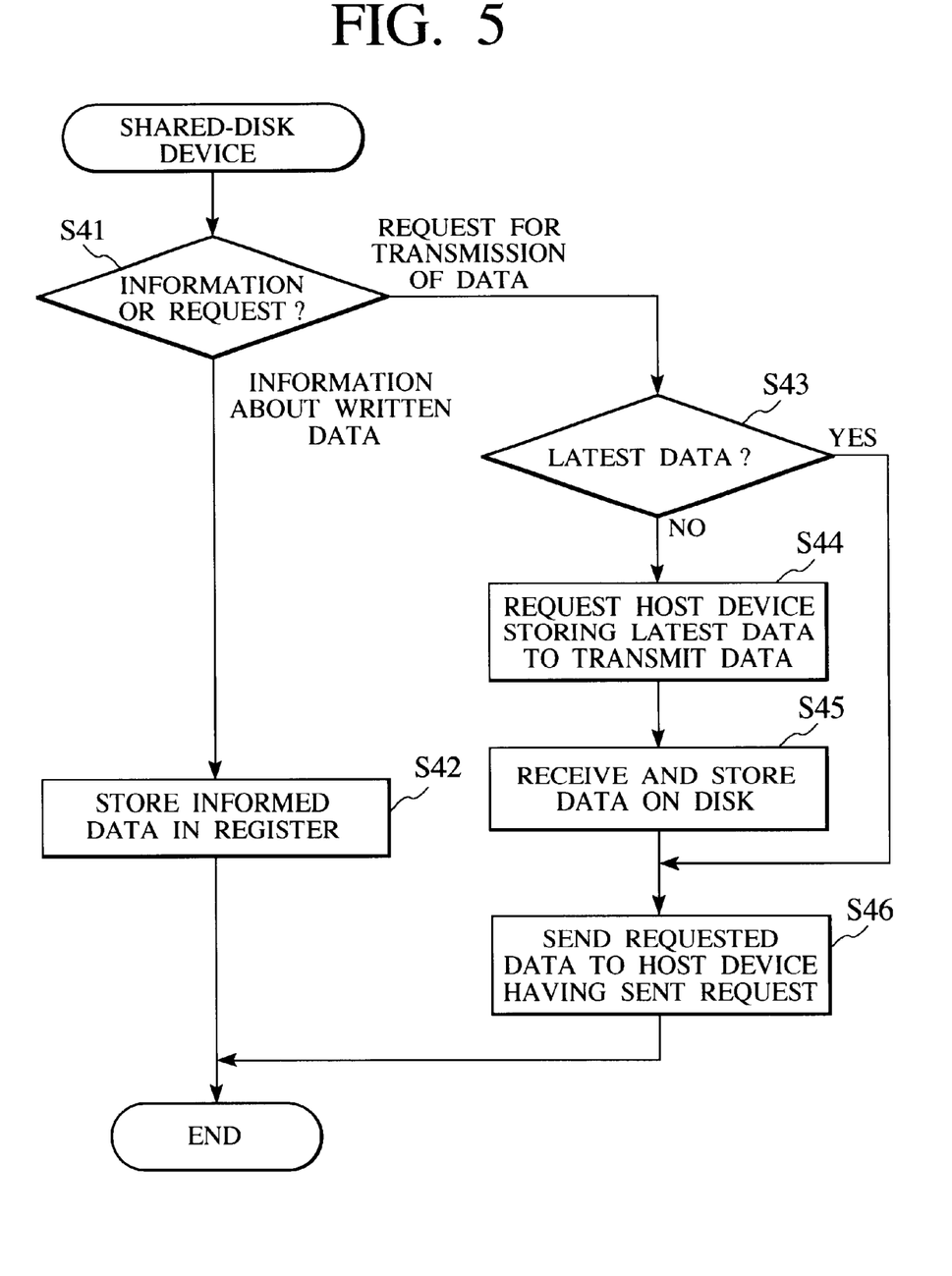
FIG. 5 is a flowchart showing a process which is carried out in a case where the shared-disk device receives a message from a host device.

FIG. 5 is a flowchart showing a process which is carried out by the processor 201 of the shared-disk device 2, in the case where the processor 201 receives a message from any one of the host devices 31 to 3n.

The processor 201 determines whether the received message is the information message sent from one of the host devices 31 to 3n in the step S15 or the request message sent from one of the host devices 31 to 3n in the step S12 or S22 (Step S41).

In the case where it is determined that the received message is the information message, the processor 201 stores, in the register 203, information representing one of the disk caches 41 to 4n which retains the latest data, in accordance with the received message (Step S42), and then completing the procedures of the flowchart.

On the contrary, in the case where it is determined that the received message is the request message, the processor 201 refers to the register 203, and determines whether the block, which is requested to be sent in the request message and stored on the disk 21, includes the latest data (Step S43). In the case where it is determined that the latest data is stored on the disk 21, the flow advances to the procedure of Step S46.

In the case where it is determined that the latest data is not stored on the disk 21, the processor 201 refers to the register 203, and sends the request message to a corresponding one of the host device 31 to 3n including one of the disk caches 41 to 4n or host devices 31 to 3n which stores the latest data of the block, through the storage area network 1 (Step S44). Upon transmission of this request message, the processor 201 will be in a processing wait state. If the processor 201 receives the data of the block from the one of the host devices 31 to 3n, it stores the received data on its disk 21 (Step S45). Then, the flow advances to the procedure of step S46.

In the step S46, the processor 201 sends the data of the block indicated by the received request message to the one of the host devices 31 to 3n which has sent the message, through the storage area network 1. This completes the procedures of the flowchart.

Operations of the disk sharing system according to this embodiment will now be described while referring to specific operational examples for the system. FIGS. 6A to 6G are exemplary diagrams for explaining the examples. In such examples, three host devices 31 to 33 are prepared for operations for maintaining the coherency.

Figure 6A:
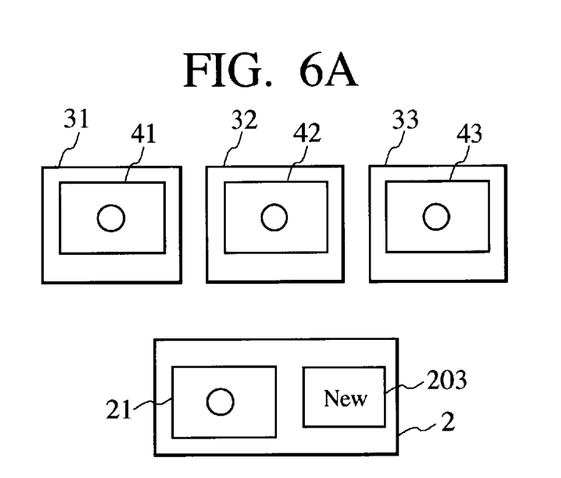
FIGS. 6A to 6G are diagrams each showing a specific example of an operation of the disk sharing system according to the embodiment of the present invention.

As shown in FIG. 6A, let it be assumed that the same data (denoted by a circle in the illustration) as the data of the same block is stored in each of disk caches 41 to 43 of the host devices 31 to 33, respectively, and on the disk 21 of the shared-disk device 2. The register 203 included in the shared-disk device 2 shows the data stored on the disk 21 is the latest data.

Figure 6B:
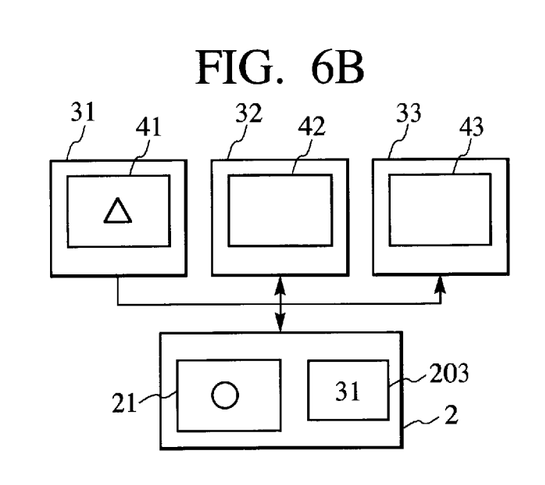

Now, let it be supposed that the host device 31 request for writing one record data (e.g. data indicated by one address). In this case, as shown in FIG. 6B, the processor 301 of the host device 31 sends an information message to the shared-disk device 2 and the host devices 32 and 33 through the storage area network 1. The processors 201 and 301 of the shared disk 2 and host devices 32 and 33 can be aware to which block of the disk 21 the data is to belong, based on the information message.

The processor 301 of the host device 31 writes the one record data to a corresponding address of the disk cache 41 which is included in the host device 31. At this stage, the data stored in the disk cache 41 is the latest data (denoted by a triangle in the illustration). The processor 201 included in the shared-disk device 2, which has received the information from the host device 31, temporarily stores data representing that the sender is the host device 31 into the register 203, in accordance with the information message. The host devices 32 and 33 erases the data of the corresponding block which are retained in the disk caches 42 and 43, in accordance with the information message.

Figure 6C:
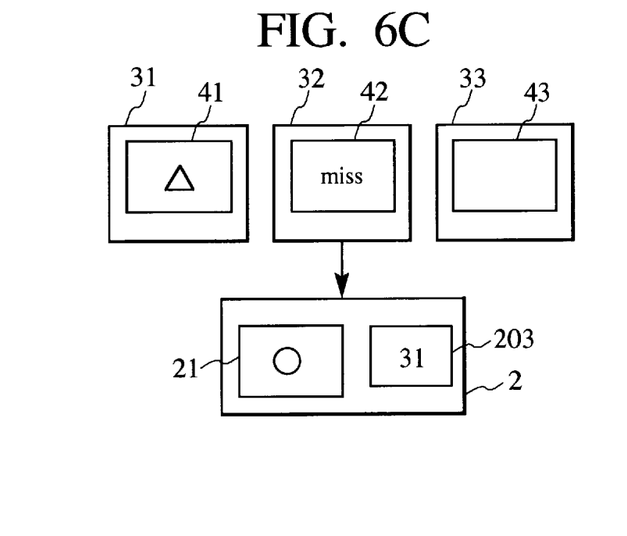

Let it be supposed that the host device 32 requests for reading data, which is one record data and belongs to the same block as the data requested to be written by the host device 31. In this case, as illustrated in FIG. 6C, the data of the corresponding block in the disk cache 42 is erased, resulting in a cache miss. Thus, the processor 301 of the host device 32 sends a request message for transmission of this block to the shared-disk device 2 through the storage area network 1.

Figure 6D:
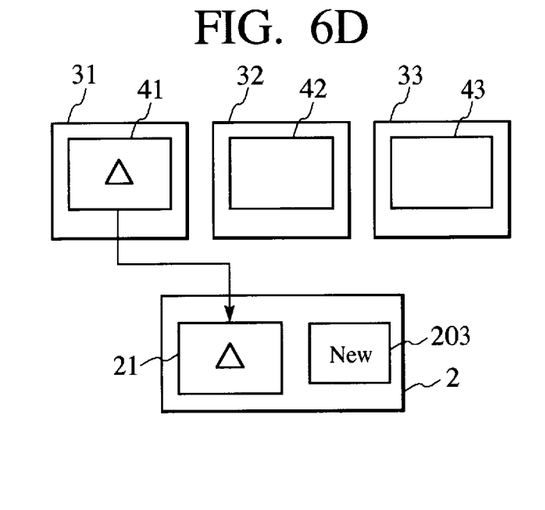

As shown in FIG. 6D, as soon as the processor 201 of the shared-disk device 2 refers to the register 203, it is aware that the data of the block stored on the disk 21 is not latest data and that the latest data is retained by the disk cache 41 of the host device 31. The processor 201 sends, to the host device 31, a request message for requesting transmission of data. Then, the processor 201 receives the latest data of the block which is stored in the disk cache 41 through the storage area network 1, and stores the received data in the corresponding block of the disk 21. The register 203 can be updated so as to represent that the data of the block in the disk 21 is the latest data.

Figure 6E:
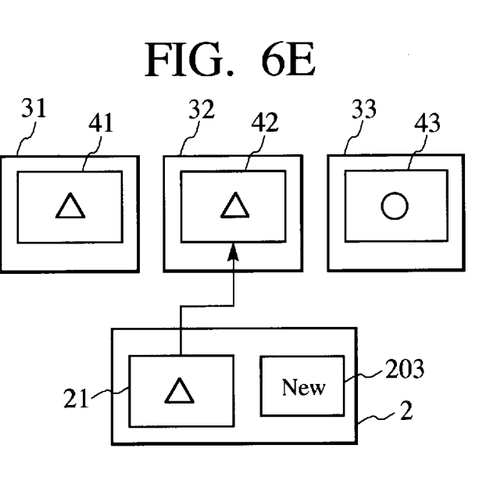

If the data of the block is transmitted onto the disk 21, the processor 201 of the shared-disk device 2 sends, as shown in FIG. 6E, the data of the block to the host device 32 having requested the data, through the storage area network 1, and the sent data is stored in the disk cache 42. In the case where the host device 32 requests to read data included in the block, the data of the block is read out from the disk caches 42, until data is newly written into the block by any one of the host devices 31 to 3n.

Figure 6F:
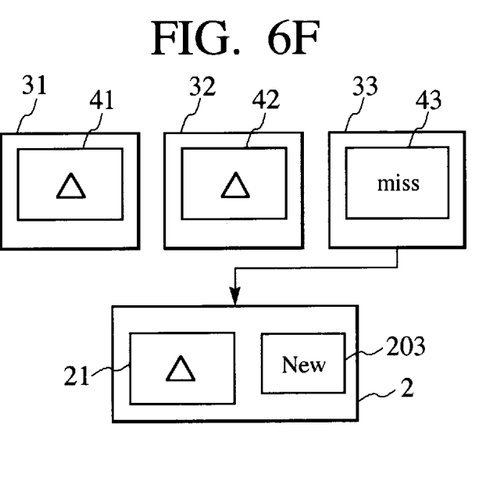

Furthermore, let it be supposed that the host device 33 requests to read out data, which belongs to the same block including the data which the host 31 has written, and which is one record data. In this case, as shown in FIG. 6F, the data of the block inside the disk cache 43 is erased, and thus resulting in a cache miss. Therefore, the processor 301 of the host device 33 sends a message for requesting transmission of the block to the shared-disk device 2 through the storage area network 1.

Figure 6G:
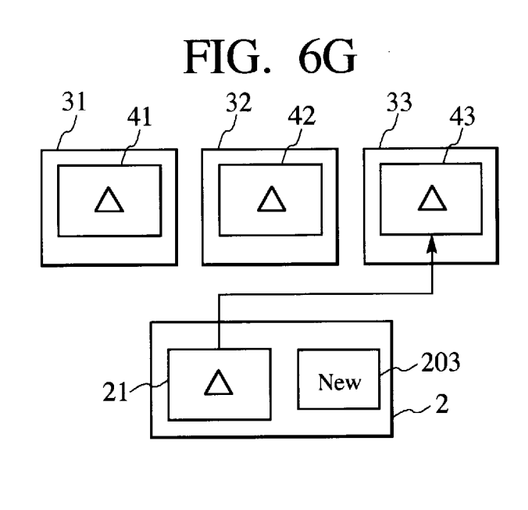

As shown in FIG. 6G, if the processor 201 of the shared-disk device 2 refers to the register 203, it recognizes that the data of the block which is stored on the disk 21 is the latest data. The processor 201 sends the data of the block which is stored on the disk 21 to the host device 33 through the storage area network 1, and the sent data is stored in the disk cache 43.

As explained above, in the disk sharing system according the embodiment of the present invention, data, which has been written in one of the disk caches 41 to 4n, is updated on the disk 21 in the shared-disk device 2, only when the data is requested from another one of the host devices 31 to 3n. Hence, even in the case where the processor 301 is to execute a process for writing data sequentially to successive address of the disk 21, there is no need to access the shared-disk device 21 one after another.

In addition, in the above embodiment, the host device 32 may request for data of a block which is not stored in the disk cache 42. In this case, as long as the latest data of the block is stored in the disk cache 41, but not on the disk 21, the shared-disk device 2 controls the host device 31 to send the requested data thereto. After the data sent from the disk cache 41 is stored on the disk 21, the shared-disk device 2 sends the data of the block which is required by the host device 32. Therefore, the data of the block is updated in the disk cache 42, and thus maintaining the coherency between the disk cache 42 and the disk 21.

As mentioned above, in the disk sharing system according to the embodiment, while maintaining the coherency between the disk 21 and the disk caches 41 to 4n, the overhead of the process required for maintaining the coherency can be reduced. Hence, the average time for the processor of each of the host devices 31 to 3n to access data stored on the disk 21 of the shared-disk device 2 can be shortened.

In the above-described embodiment, in the case where a block including data which is requested by the host devices 31 to 3n is not stored in their own disk caches 41 to 4n, the processor 301 is to write the block including the data in a corresponding one of the disk caches 41 to 4n, after the block is sent from the shared disk device 2. Instead of this method, in the above-described embodiment, the following data storage method can be employed.

In the case where there is a cache miss in the disk caches 41 to 4n in the step S11, the processor 301 included in each of the host devices 31 to 3n adds data to be written and an address thereof to a data transmission request to be sent to the shared-disk device 2 in the step S12. Then, this process is terminated without executing the procedures of the steps S14 and S15.

Figure 7:
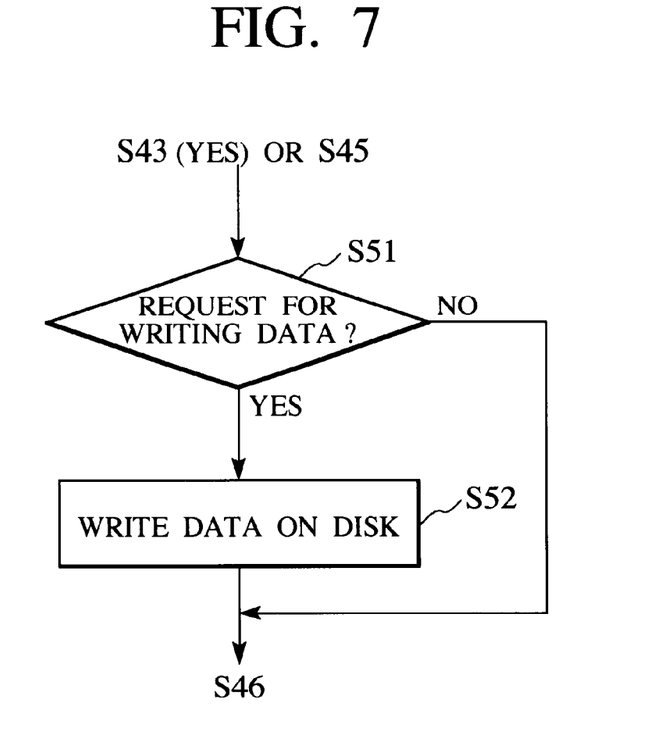
FIG. 7 is a flowchart showing a modification of the process performed by the shared-disk device.

In the shared-disk device 2, those procedures including the steps shown in FIG. 7 which are added into the flowchart of FIG. 5 are carried out. In the case where it is determined that the data of the block which is stored on the disk 21 is the latest data in the step S43, or if the procedures of the step S45 is completed, the processor 201 determines whether the data transmission request has been sent according to a request for writing data (Step S51). In the case where it is determined that the data transmission request has not been sent according to the request for writing data, the flow advances to the procedures of step S46 included in FIG. 5. In the case where it is determined that the data transmission request has been sent according to the request for writing data, the requested data is written on the disk 21 (Step S52), and the flow advances to the procedure of step S46 included in FIG. 5.

In the above-described embodiment, in the case where a block including data which the host devices 31 to 3n request to read or write is erased from their own disk caches 41 to 4n, the data of the block is simply sent from the shared-disk device 2 to any of the host devices 31 to 3n which has sent the request for reading or writing the data. In the case where the data of the same block is required by another one of the host devices 31 to 3n, the data is sent again from the shared-disk device 2 to the another one of the host devices 31 to 3n. In addition to the above, in response to a data transmission request from any one of the host devices 31 to 3n, the data of the block can be sent to any other one of the host devices 31 to 3n.

In the above-described embodiment, the processes of the flowcharts of FIGS. 2 to 5 and 7 are stored as programs in the memory 202 and memory 302, and are to be executed by the processors 201 and 301. That is, the function for maintaining the coherency between the disk caches 41 to 4n and the disk 21 is realized by the software. In addition to this, the disk sharing system of this embodiment may include hardware having the same processing functions as that of the processes of the flowcharts of FIGS. 2 to 5 and 7, so that a function for maintaining the coherency between the disk 21 and the disk caches 41 to 4n can be realized.

Figure 8:
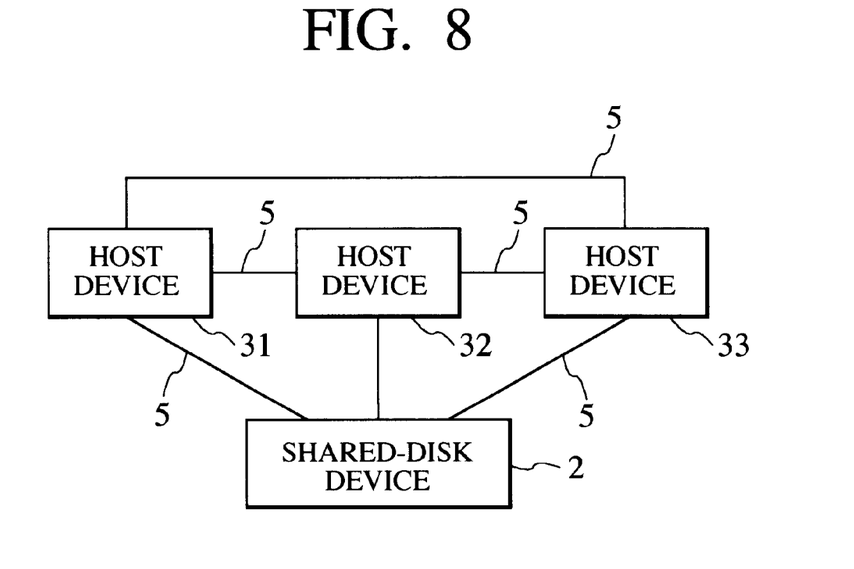
FIG. 8 is a block diagram showing a modification of the disk sharing system.

In the above-described embodiment, the shared-disk device 2 and the host devices 31 to 3n transmit messages to each other through the storage area network 1. However, data transmission may be performed between the shared-disk device 2 and each of the host devices 31 to 3n and between the host devices 31 to 3n, through one of signal lines 5 arranged therebetween, as shown in FIG. 8.

In the above-described embodiment, the host devices 31 to 3n are connected to the shared-disk device 2 through the storage area network 1. Other than that, the external storage device shared by the host devices 31 to 3n may be any one of a magnetic tape device, a magneto-optical disk, an optical disk device, and a semiconductor memory device. In the case where any one of the above external storage devices is employed, each of the host devices 31 to 3n can include a cache which can be accessed in a shorter time than the case of the external storage device, in its memory device. Each of the host devices 31 to 3n may include a memory device only for the included cache.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2000-204938 filed on Jul. 6, 2000, and including specification, claims, drawings and summary. The disclosure of the above Japanese Patent Applications is incorporated herein by reference in its entirety.

What is claimed is:

1. An external-storage sharing system including a plurality of host devices and an external storage device which is connected to each of the plurality of host devices, and each of said plurality of host devices having a cache retaining a portion of data stored in said external storage device, and wherein:

each of said plurality of host devices includes:
write-informing means for informing any other one of said plurality of host devices and said external storage device that the data is to be written and for sending information representing a block including the data to be written in a case where data is to be written in its own cache, data-requesting means for requesting said external storage device to transmit the data of the block in a case where data of the block sent from said write-informing means of any one of said plurality of host devices is to be written or read, and data-reading/writing means for reading or writing the data after the data of the block is written back into said external storage device in response to the requesting of said data-requesting means; and said external storage device includes
data-write-back means for writing back the data of the block from the cache of one of said plurality of host devices including said write-informing means having informed that the data has been written, in a case where transmission of data is requested from said data-requesting means of any one of said plurality of host devices, and data transmission means for transmitting the data of the block to the cache of one of said plurality of host devices including said data-requesting means having requested the transmission of the data, after the data of the block is written back into said external storage device by said data-write-back means.

2. The external-storage sharing system according to claim 1, wherein each of said plurality of host devices further includes data-erasing means for erasing the data of the block included in its own cache, in a case where said write-informing means of any other one of said plurality of host devices informs each of said plurality of host devices to write the data of the block.

3. An external-storage sharing system including a plurality of host devices and an external storage device, which is connected to each of said plurality of host devices and stores data in a unit of blocks, and wherein:

each of said plurality of host devices includes a cache retaining data of a part of entire blocks included in said external storage device, a first memory storing a first program for reading and writing data stored in said external storage device and a second program for maintaining coherency between said external storage device and the cache of each of said plurality of host devices, and a processor for executing the first and second programs stored in the first memory;

the second program includes
 a step of writing the data to be written in the cache in the corresponding one of said plurality of host devices, and informing any other one of said plurality of host devices and said external storage device that writing of the data is performed, in a case where data to be written in accordance with the first program is retained in the cache included in a corresponding one of said plurality of host devices,
 a step of requesting said external storage device to transmit the data of the block, in a case where data of a block is to be read, said data including data, which is informed from any other one of said plurality of host devices in accordance with the first program, and
 a step of reading data to be read from the cache included in the corresponding one of said plurality of host devices, after storing the data of the block which is transmitted from said external storage device in response to the requesting for transmission of the data; and said external storage device includes a second memory storing a third program for maintaining coherency between said external storage device and the cache of each of said plurality of host devices, and a processor executing the third program stored in the second memory; and said third program includes
 a step of managing information representing whether data of each block which is stored in said external storage device is latest data, in accordance with information for writing data and which is sent from each of said plurality of host devices, and
 a step of transmitting, in response to a request for transmission of data from any one of said plurality of host devices, the latest data as requested data of a corresponding block to a corresponding one of said plurality of host devices which has sent the request.

4. The external-storage sharing system according to claim 3, wherein:

the second program further includes a step of erasing a block including the data from the cache included in a corresponding one of said plurality of host devices, in a case where any other one of said plurality of host devices informs that writing of data is performed; and said step of requesting for transmission of data, in case of data reading, requests said external device to transmit the data of the block, in a case where data to be read is erased from the cache included in the corresponding one of said plurality of host devices.

5. The external-storage sharing system according to claim 3, wherein the second program further includes:

a step of requesting said external storage device to transmit the data of the block, in a case where data of a block including data which is informed from the any other one of said plurality of host devices in accordance with the first program is to be written; and a step of writing data to be written into the cache included in a corresponding one of said plurality of host devices, after storing the data of the block which is transmitted from said external storage device in response to the requesting of the transmission of the data, in the cache in the corresponding one of said plurality of host devices.

6. The external-storage sharing system according to claim 5, wherein:

the second program further includes a step of erasing a block including the data from the cache included in the corresponding one of said plurality of host devices, in a case where any other one of said plurality of host devices informs that writing of data is performed; and said step of requesting for transmission of data, in case of data writing, requests said external storage device to transmit the data of the block, in a case where data to be written has been erased from the cache of the corresponding one of said plurality of host devices.

7. The external-storage sharing system according to claim 3, wherein:

the third program further includes
 a step of determining whether data of a corresponding block which is retained in the external storage device is latest data, in a case where transmission of data is requested from one of said plurality of host devices,
 a step of requesting one of said plurality of host devices which has a cache retaining the latest data to transmit the data of the block, in a case where it is determined that the data is not the latest data, and
 a step of storing, in said external storage device, the data of the block, which is transmitted from the host device having requested the transmission of the data in response to the requesting of transmission of the data;

said step of transmitting data to the host device having requested the transmission of the data is executed upon transmission of the data of the block from the host device having requested the transmission; and said second program further includes a step of transmitting the data of a corresponding block which is retained in the cache included in the corresponding one of said plurality of host devices, in a case where transmission of data is requested from said external storage device in accordance with the third program.

8. The external-storage sharing system according to claim 3, wherein said external storage device and said plurality of host devices are connected with each other through a network, and transmit and receive data to and from each other through a network.

9. The external-storage sharing system according to claim 3, wherein said external storage device is a hard disk device.

10. The external-storage sharing system according to claim 3, wherein the cache is prepared in a portion of the first memory included in each of said plurality of host devices.

11. A host device which shares with at least one host device an external storage device storing data in a unit of blocks, said host device including:
   a cache which retains data of a part of entire blocks included in said external storage device;
   a memory which stores a first program for reading and writing data stored in said external storage device and a second program for maintaining coherency between said external storage device and said host device; and
   a processor which executes the first and second programs stored in said memory, and
   wherein said second program includes
      a step of writing data to be written in the cache included in said processor, in a case where data to be written in accordance with the first program is retained in the cache included in the memory of said host device, and informing said at least one host device and said external storage device that the writing of the data is performed,
      requesting said external storage device to transmit the data of the block, in a case where data of a block including data which is informed from the at least one host device in accordance with the first program is to be read, and
      a step of reading data to be read out from the cache included in the memory of said host device, after storing the data of the block which is transmitted from the external storage device in response to the request for transmission of the data.

12. The host device according to claim 11, wherein:
   the second program further includes a step of erasing a block including the written data from the cache included in the memory of said host device, in a case where the at least one host device informs that writing of data is performed; and
   said step of requesting the transmission of data, in case of data reading, requests said external storage device to transmit data of a corresponding block, in a case where the data to be read is erased from the cache included in the memory of said host device.

13. The host device according to claim 11, wherein the second program further includes:
   a step of requesting said external storage device to transmit the data of the block, in a case where data of a block including data which is informed from the at least one host device in accordance with the first program is to be written; and
   a step of writing data to be written in the cache included in the memory of said host device after storing in the cache the data of the block transmitted from said external storage device in response to the requesting of the transmission of the data.

14. The host device according to claim 13, wherein:
   the second program further includes a step of erasing a block including the data from the cache included in the memory of said host device, in a case where the at least one host device informs that writing of data is performed; and
   said step of requesting the transmission of data, in case of data writing, requests said external storage device to transmit the data of the block, in a case where data to be written has been erased from the cache included in the memory of said host device.

15. A method, for use in a system for sharing an external storage device between a plurality of host devices each having a cache, for maintaining coherency between said external storage device and the cache included in each of said plurality of host devices, said method comprising:
   informing said external storage device and any other one of said plurality of host devices that the data is to be written in the cache and sending information regarding a block including the data to be written, in a case where data in the cache of an arbitrary one of said plurality of host devices is to be written;
   requesting, in one of said plurality of host devices said external storage device to transmit the data of the block, in a case where data of the block which is written and has already been informed from said arbitrary one of said plurality of host devices is to be written or read;
   writing back in said external storage device the data of the block from the cache of the arbitrary one of said plurality of host devices having informed about the writing of data, in a case where transmission of data is requested;
   reading or writing the data in the any other one of said plurality of host devices, after the data of the block is written back into said external storage device; and
   transmitting the data of the block from said external storage device into the cache of the any other one of said plurality of host devices having requested the transmission of the data, after the data of the block has been written back thereinto.

16. The method according to claim 15, further comprising, in a case where the information is sent by said informing in said any other one of said plurality of host devices, erasing the data of the block inside the cache included in the arbitrary one of said plurality of host devices.

17. A computer readable recording medium which records a program executed in each of a plurality of host devices so as to maintain coherency between a cache included in each of said plurality of host devices and an external storage device, in a system comprising said external storage device storing data in a unit of blocks and said plurality of host devices, each of which has the cache retaining data of a part of entire blocks included in said external storage device and which shares said external storage device with each other, and said program including the steps of:
   writing data to be written into the cache included in a corresponding one of said plurality of host devices, and informing any other one of said plurality of host devices that the writing of the data is performed, in a case where the data to be written is retained in the cache included in the corresponding one of said plurality of host devices;
   requesting said external storage device to transmit the data of the block, in a case where data of a block including data which is written and informed by the any other one of said plurality of host devices is to be transmitted; and
   reading data to be read from the cache included in the corresponding one of said plurality of host devices, after storing the data of the block transmitted from said external storage device in response to the requesting of transmission the data.

18. The recording medium according to claim 17, wherein:
   the program further includes a step of erasing the block of the data from the cache of the corresponding one of said plurality of host devices, in a case where the any other one of said plurality of host devices informs that the writing of data is performed; and said step of requesting for transmission of data, in case of data reading, requests said external storage device to transmit data of a block, in a case where the data to be read has been erased from the cache included in the corresponding one of said plurality of host devices.

19. The recording medium according to claim 17, wherein said program further includes the steps of:

requesting said external storage device to transmit the data of the block, in a case where data of a block including data which is written and informed by the any other one of said plurality of host devices is to be transmitted; and writing data to be written in the cache of the corresponding one of said plurality of host devices after storing into the cache of the corresponding one of said plurality of host devices the data of the block transmitted from said external storage device in response to the requesting of transmission of the data.

20. The recording medium according to claim 19, wherein:

the program further includes a step of erasing the data of the block from the cache of the corresponding one of said plurality of host devices, in a case where the any other one of said plurality of host devices informs that writing of data is performed; and said step of requesting the transmission of data, in case of data writing, requests said external storage device to transmit data of a block, in a case where the data to be written has been erased from the cache of the corresponding one of said plurality of host devices.

* * * * *